April 23, 1940.　　　J. TJAARDA　　　2,198,353
MOTOR VEHICLE
Original Filed Aug. 6, 1936　　2 Sheets-Sheet 1
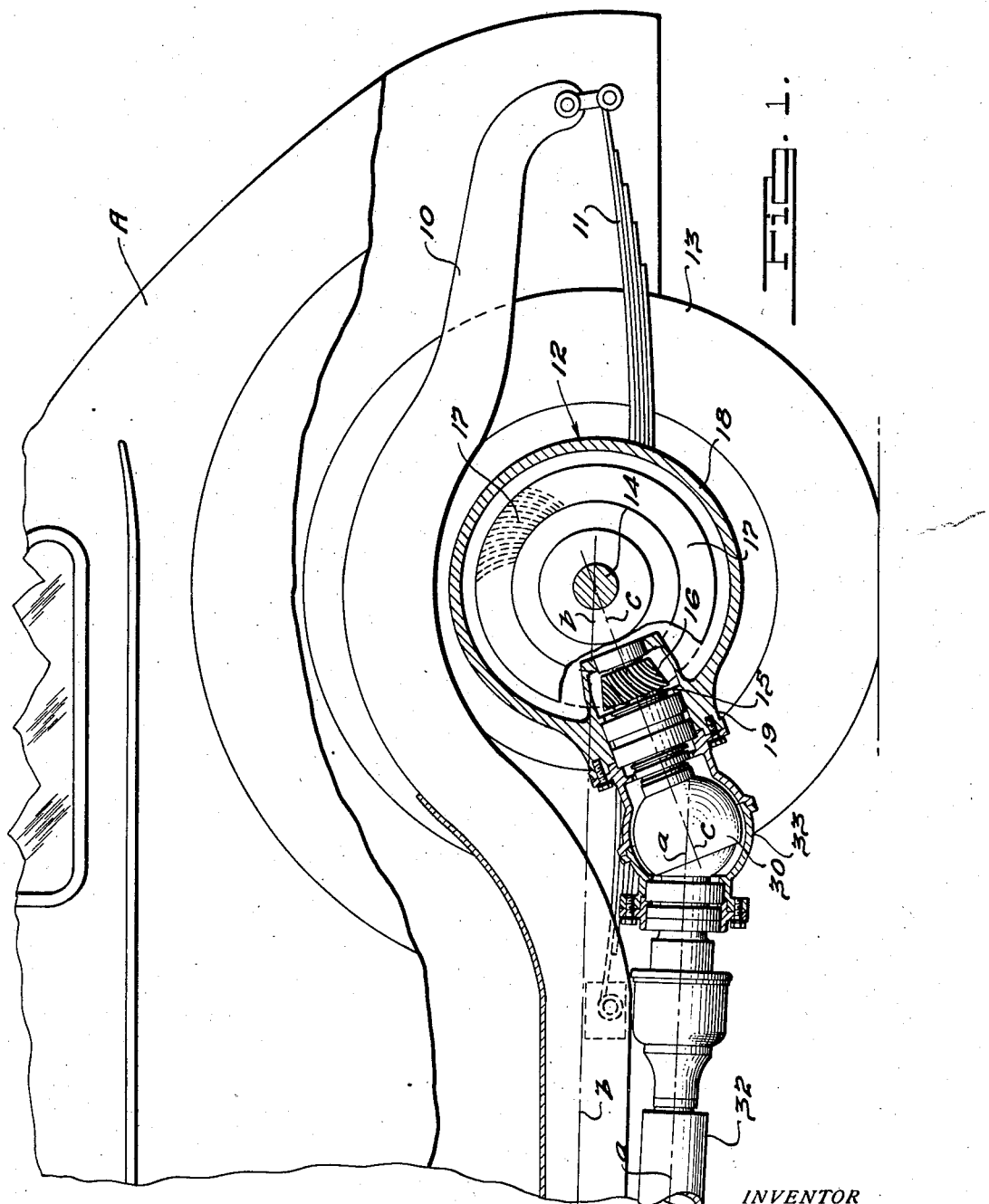
INVENTOR
John Tjaarda.
BY
Dike, Calvert & Gray
ATTORNEYS

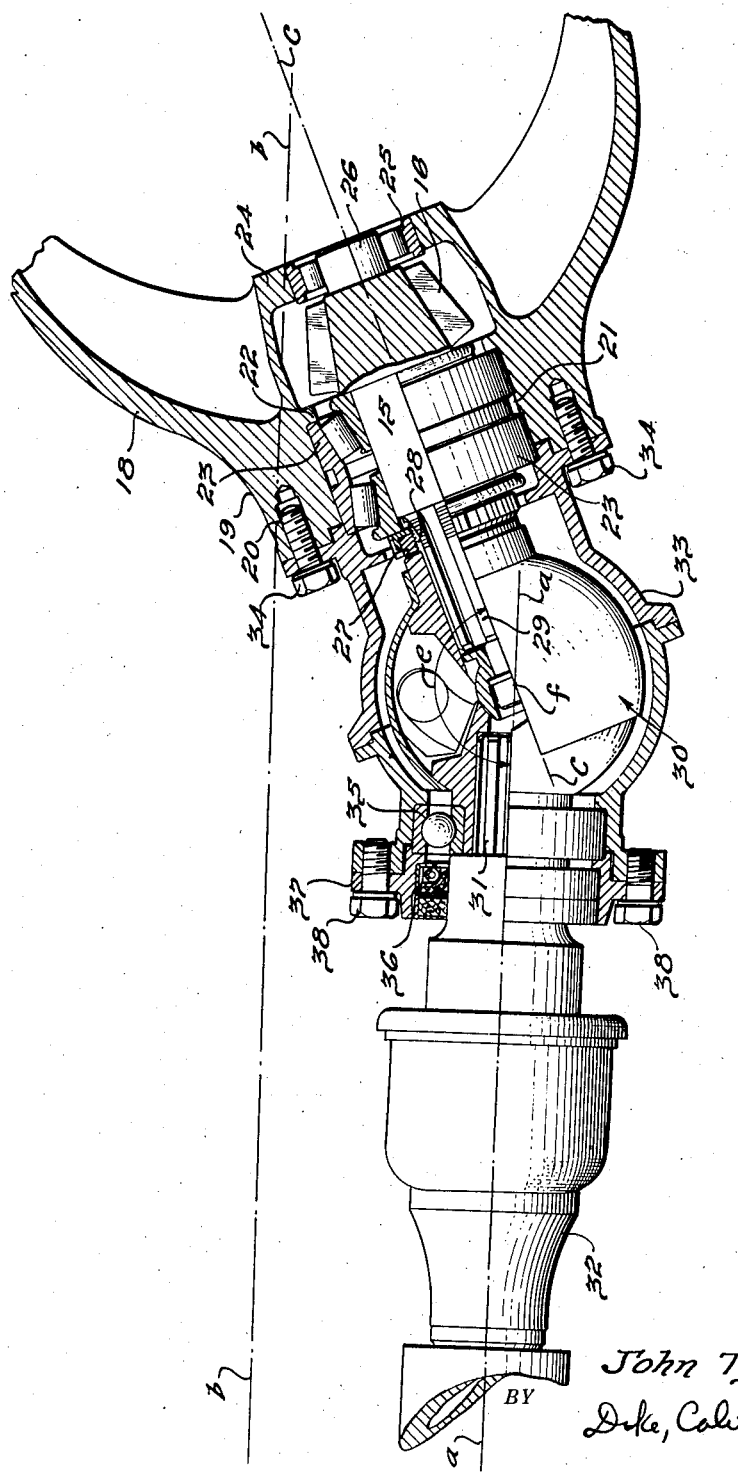

Patented Apr. 23, 1940

2,198,353

UNITED STATES PATENT OFFICE 2,198,353

MOTOR VEHICLE

John Tjaarda, Detroit, Mich., assignor to Briggs Manufacturing Company, Detroit, Mich., a corporation of Michigan Application August 6, 1936, Serial No. 94,648
Renewed May 25, 1939

12 Claims. (Cl. 180—73)

This invention relates to motor vehicles and more particularly to such motor vehicles as have their engines mounted at the opposite end from the driving wheels, such, for instance, as motor vehicles having front mounted engines and rear mounted final drives.

It is one of the objects of the present invention to provide a novel motor vehicle which has a rear axle drive and an engine mounted at the front, and in which the floor structure of the passenger compartment is lowered much more than it is possible to do with the given elevation of the transmission and the rear axle without providing an arched tunnel in the floor structure of the vehicle.

Another object of the invention is to provide a novel motor vehicle of greatly increased stability and in which the diameter of the wheels is not decreased beyond practical requirements.

A further object of the invention is to provide a novel motor vehicle in which the power from the front mounted engine is transmitted to the rear mounted final drive along a broken line path and under the floor structure of the passenger compartment of the vehicle.

A still further object of the invention is to provide a novel motor vehicle in which the prolonged center line of the propeller shaft passes at a substantial distance under the rear axle.

A still further object of the invention is to provide a motor vehicle of the above character in which the number of universal joints employed is reduced to a minimum and only one universal joint is used between the propeller shaft and the driving pinion shaft.

A still further object of the invention is to provide a motor vehicle of the foregoing character in which the torque tube is eliminated and the driving effort as well as the torque reaction are transmitted to the vehicle structure by the rear springs.

It is an added object of the present invention to provide a vehicle accomplishing the above objects which is simple in construction and cheap to manufacture, particularly in large volume.

Other objects of this invention will appear in the following description and appended claims, reference being had to the accompanying drawings forming a part of this specification wherein like reference characters designate corresponding parts in the several views.

Fig. 1 is a side view, partly in section, of the rear portion of a motor vehicle embodying my invention.

Fig. 2 is an enlarged fragmentary side view, partly in section, this view illustrating particularly the use of the single universal joint connecting the propeller shaft and the final drive shaft.

Before explaining in detail the present invention it is to be understood that the invention is not limited in its application to the details of construction and arangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings there is shown, by way of example, a rear driven motor vehicle having an engine (not shown) mounted at its front, said vehicle having a rear mounted final drive of the spiral bevel gear type. However, it is to be expressly understood that my invention is not limited in its broader aspects to rear driven motor vehicles or to any particular type of drive, and that it is capable of being applied to motor vehicles having other types of drives, such as worm and gear drive, or to vehicles having different types of engine and driving axle mountings.

Referring more particularly to Fig. 1, A indicates generally the body of a motor vehicle of the character mentioned, having a frame 10 which is sprung by means of suitable springs 11, said springs being supported by the driving rear axle 12, carrying driving wheels 13. The wheels are driven by the axle shafts, such as shaft 14, which are operatively connected with the aid of suitable differential mechanism to the final drive shaft 15 carrying a driving pinion 16 meshing with the ring gear 17 secured to said differential. The final drive is enclosed in a housing 18 which has a forwardly protruding extension 19 provided with a number of internally threaded screw receiving holes 20 and a bearing receiving recess 21 extending up to a shoulder 22, into which recess is pressed a suitable bearing 23 supporting the final drive shaft 15. An inwardly protruding hollow extension 24 is provided with a recess into which is pressed a bearing 25 supporting the tail end 26 of the final drive shaft. It is preferable to make the bearing 23 of the double direction thrust type in order to enable said bearing to withstand axial thrust in both directions, while the bearing 25 may be designed to carry transverse loads only.

The shaft 15 carries a suitable spiral bevel pinion 16 preferably formed integrally thereon, said pinion meshing with the spiral bevel ring gear 17. The middle portion of the shaft 15 is turned down to a proper diameter to carry by friction the inner rings of the bearing 23. A retainer nut 27 engaging an externally threaded portion 28 of the shaft 15 holds the bearing 23 firmly set with respect to said shaft 15. The forward end of the shaft 15 is externally splined as shown at 29.

In contravention to the customary practice in the art, the shaft 15, although having its axis intersecting the axis of the driving axle shafts, is set at a certain angle with the horizontal. Its forward end, that is, the end on the propeller shaft side, is set lower than the pinion carrying end, in consequence whereof its axis forms an angle with the axis of the propeller shaft. Said angle may vary within certain limits, the preferred angle being about fifteen to twenty degrees.

The splined end 29 of the shaft 15 engages a universal joint 30, which joint is in operative engagement with a similarly splined end 31 of the propeller shaft 32. Said propeller shaft is connected to the transmission shaft (not shown) and transmits power from the engine to the final drive ring gear 17 through said universal joint 30 and the shaft 15.

Any suitable construction of the universal joint may be employed in connection with my novel motor vehicle. It is preferable to use a universal joint of the constant velocity type capable of effecting uniform angular speed in the driven shaft, that is shaft 15, and capable of transmitting power through the above specified angle without excessive friction and wear.

The universal joint 30 is housed in a casing or housing 33, the final drive shaft end whereof is secured to the housing 18 by means of a plurality of screws 34, while the propeller shaft end of said housing 33 is provided with a recess into which is pressed a bearing 35 supporting the propeller shaft end of said universal joint and consequently giving support to the rearward end of the propeller shaft 32. In order to prevent flowing out of the grease filling the interior of the casings 33 and 18, a grease seal 36 is provided at the propeller shaft end of the housing 33, said seal being arranged in a suitable recess of a separate piece 37 secured to the housing 33 by means of screws 38.

In the present embodiment of the invention the propeller shaft is intended only for transmitting the torque and no torque tube is provided. Both the torque reaction and the driving thrust are transmitted to the frame 10 by means of springs 11, the main leaves of said springs being made strong enough to carry this additional load.

By virtue of the above construction the axis a—a of the propeller shaft 32 passes considerably below the line b—b connecting the respective centers of the rear end of the transmission shaft and of the ring gear 17. Said line a—a intersects the axis c—c of the shaft 15 at the point f, which point is the vertex of the included angle e formed by said lines. It is an important feature of my invention that the actual axis a—a of the propeller shaft, which in conventional structures is made substantially coincident with the line b—b connecting the respective centers of the rear end of the transmission shaft and of the ring gear, is in my novel structure separated from said line b—b and is made to pass considerably below it, as is clearly indicated in the drawings. The distance between said lines represents substantially the distance through which the middle portion of the frame and of the vehicle body may be lowered for the purpose of increasing the stability of the vehicle at high speeds, or for eliminating the arched tunnel in the floor of the passenger compartment of the low set vehicle bodies. It will be understood that the plane of the floor of the vehicle body may extend, if desired, at or below the line b—b. It is also important to note that by virtue of the above described construction the universal joint 30 is located considerably below the point of meshing of the gears 16 and 17 of the final drive.

Thus, considered from one of its broader aspects, my invention contemplates providing a novel motor vehicle with its engine and final drive mounted at opposite ends of the vehicle, power being transmitted from the engine to the final drive with the aid of a propeller shaft which is provided at its rearward end with a universal joint which permits considerable lowering of the propeller shaft of the passenger compartment of the vehicle. By the above described simple means many important advantages are accomplished, and motor vehicles with the engine and final drive mounted at opposite ends become better adapted for high speeds.

I claim:

1. In a motor vehicle, a frame, a transverse rear axle, a final drive housing associated therewith, springs adapted to transmit to the said frame the driving thrust and the torque reaction from said final drive housing, a final drive shaft operatively connected to the axle and extending forwardly and downwardly therefrom, a propeller shaft having its axis forming with respect to the major axis of the final drive shaft an included angle of less than 180 degrees, a universal joint drivingly connecting said shaft, and a housing for said joint, said housing being secured to said final drive housing.

2. In a motor vehicle, a frame, a transverse rear axle, a final drive housing associated therewith, springs adapted to transmit to the said frame the driving thrust and the torque reaction from said final drive housing, a final drive shaft operatively connected to the axle and extending forwardly and downwardly therefrom, a propeller shaft having its axis forming with respect to the major axis of the final drive shaft an included angle of less than 180 degrees, a universal joint drivingly connecting said shafts, and a housing for said joint, said housing being secured to said final drive housing and supporting the rearward extremity of said propeller shaft.

3. In a motor vehicle, a floor structure, a frame, a transverse rear axle, a final drive housing associated therewith, springs adapted to transmit to the said frame the driving thrust and the torque reaction from said final drive housing, a final drive shaft set at an angle to the horizontal for driving said rear axle, a propeller shaft, a universal joint mechanism connecting said shafts, and means for maintaining said shafts and mechanism at a constant relative angularity of less than 180 degrees, whereby lowering of said floor structure is permitted.

4. In a vehicle including a source of power, driving wheels, a differential operably connected to the wheels, power transmitting means between the source of power and the differential, said means comprising a drive shaft operably connected to the source of power, a final drive pinion projecting forwardly and downwardly from the differential, and a high angle constant angle velocity universal joint interconnecting the drive shaft and the final drive pinion.

5. In a motor vehicle, a rear mounted final drive of the gear and pinion type, a propeller shaft adapted to transmit power to said final drive, a single constant velocity universal joint between said drive and said propeller shaft, the center of said joint being disposed below the point of contact of the final drive gears.

6. In a motor vehicle, a propeller shaft, a final drive having a drive shaft, a single high angle constant velocity universal joint between said propeller shaft and said drive shaft, said final drive shaft being set at an angle to the horizontal in order to have the center of said universal joint disposed below the point of contact of the final drive gears.

7. In a motor vehicle having a driving axle, a final drive shaft located at said driving axle and extending forwardly and downwardly therefrom, a propeller shaft for transmitting power to said drive shaft, and a single high angle constant velocity universal joint between said propeller shaft and said final drive shaft.

8. In a motor vehicle having a driving axle, a final drive of the bevel gear type having a final drive shaft located perpendicularly with respect to the driving axle and extending downwardly therefrom, a propeller shaft transmitting power to said drive shaft, the center lines of said propeller shaft and said drive shaft intersecting at a point below the center line of the rear axle, and a single high angle constant velocity universal joint between said propeller shaft and said final drive shaft.

9. In a motor vehicle having a driving axle mounted at its rear, driving means for said axle including a ring gear and a pinion engaging the same, a propeller shaft transmitting power to said driving means, a final drive shaft located at the driving axle and at right angles thereto, the center line of said drive shaft extending forwardly and downwardly of the center line of said driving axle, and a single high angle constant velocity universal joint between said propeller shaft and said final drive shaft.

10. In a motor vehicle having a floor structure, a rear mounted final drive of the gear and pinion type having a drive shaft, a propeller shaft for transmitting power to said final drive, said propeller shaft being located below the floor of the vehicle, its center line being offset downwardly at an angle with respect to the center line of the final drive shaft, the center line of said drive shaft forming an angle with the horizontal, and a single constant velocity universal joint between said propeller shaft and said drive shaft.

11. That method of driving a motor vehicle having a generally transverse rear axle and final drive mechanism associated therewith including a final drive shaft operably connected to the axle and extending forwardly and downwardly therefrom which comprises driving the final drive shaft through a generally horizontally extending propeller shaft operably connected to the final drive shaft through a constant angle velocity universal joint adapted to transmit uniform rotative movement of the propeller shaft to the final drive shaft.

12. In a motor vehicle having a generally horizontally and transversely extending rear axle, a final drive shaft operably connected to the axle and extending forwardly and downwardly therefrom, a generally horizontally disposed longitudinally extending propeller shaft, and connecting means comprising a constant angle velocity universal joint interconnecting the generally horizontally disposed propeller shaft and the forwardly and downwardly extending final drive shaft to uniformly transmit rotative movement of the propeller shaft to the final drive shaft.

JOHN TJAARDA.

CERTIFICATE OF CORRECTION.

Patent No. 2,198,353.                                    April 23, 1940.

JOHN TJAARDA.

It is hereby certified that error appears in the printed specification of the above numbered patent requiring correction as follows: Page 2, second column, line 42, claim 1, for the word "shaft" read --shafts--; and that the said Letters Patent should be read with this correction therein that the same may conform to the record of the case in the Patent Office.

Signed and sealed this 23rd day of July, A. D. 1940.

(Seal)

Henry Van Arsdale,
Acting Commissioner of Patents.